Dec. 11, 1923. 1,476,786
A. L. ABBOTT
TESTING DEVICE FOR AUTOMATIC SPRINKLER HEADS, ETC.
Filed May 21, 1920
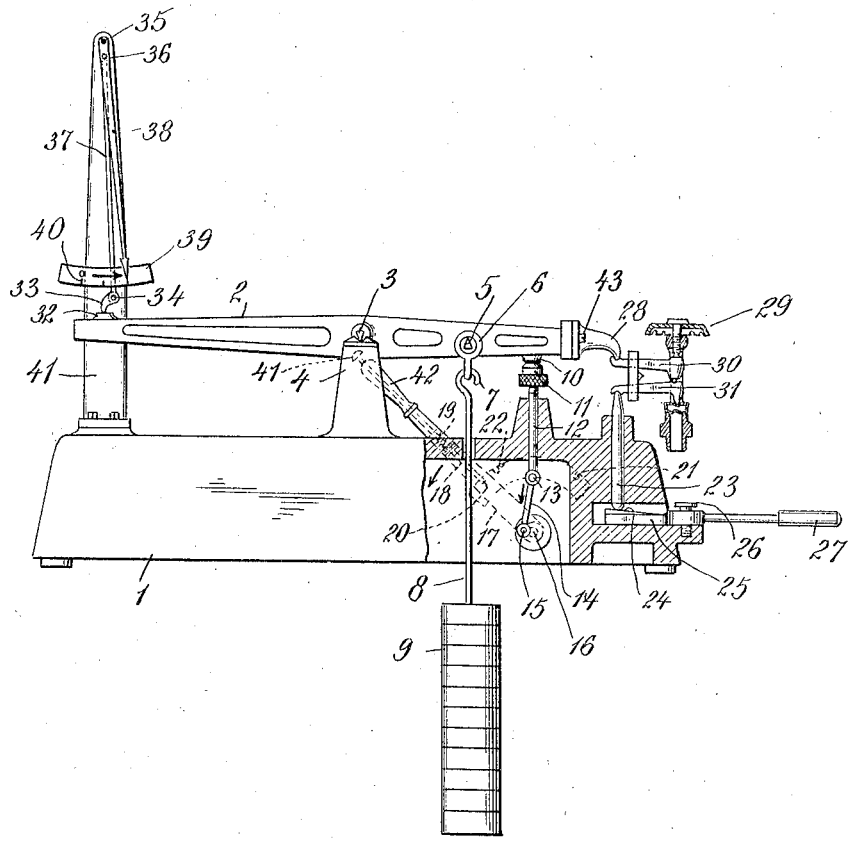
Inventor
Albert L Abbott
By his Attorney
Harry L Duncan Patented Dec. 11, 1923.

1,476,786

UNITED STATES PATENT OFFICE.

ALBERT L. ABBOTT, OF YOUNGSTOWN, OHIO, ASSIGNOR TO OHIO AUTOMATIC SPRINKLER COMPANY, OF YOUNGSTOWN, OHIO, A CORPORATION OF OHIO.

TESTING DEVICE FOR AUTOMATIC SPRINKLER HEADS, ETC.

Application filed May 21, 1920. Serial No. 383,212.

*To all whom it may concern:*

Be it known that I, ALBERT L. ABBOTT, of Youngstown, Mahoning County, State of Ohio, have made a certain new and useful invention relating to Testing Devices for Automatic Sprinkler Heads, Etc., of which the following is a specification taken in connection with the accompanying drawing.

This invention relates especially to devices for adjusting the tension of automatic sprinkler heads or the like so that the usual strut levers holding closed the valve or shut-off device of the head and cooperating with the fusible links or members may be placed under substantially the standard tension desired. For this purpose magnifying or other indicating means may be provided to indicate the yield of the parts under the action of a testing force; for example the sprinkler head may be originally assembled with the compression or set screws overtightened so that the strut levers and cooperating parts are over-tensioned, and then the head may be placed in the testing device in engagement with a testing lever or element of any suitable character and a standard weight, spring or other pressure applied to the strut levers of the head. The position of the head and testing lever is preferably then adjusted so that a cooperating indicating device is brought to zero, and the compression set screw or other adjusting device of the sprinkler head may then be progressively changed or loosened until the standard testing force applied to the strut levers causes the proper slight yielding thereof to correspond to a considerable or standard movement of the connected indicating mechanism, after which the head may be released from the testing lever and its compression screw pinned or otherwise definitely secured in this adjusted position.

The illustrative embodiment of this testing mechanism is shown in a somewhat diagrammatic way in the accompanying drawing which is a side elevation, parts being shown in section.

The testing device may as indicated comprise a suitable base 1 on which fulcrum members 4 may be arranged so as to support the knife edge bearings 3 of the testing lever 2. The testing pressure used in connection with this lever may be applied to the knife edge bearings 5 of the lever with which the cooperating bearing members 6 may engage so as to connect them with the hook 7 on the end of the weight stem 8 to which any desired number of adjustable weights 9 may be secured. One end of this testing lever, preferably one adjacent the weight, may be arranged with a suitable contact end, such, for example, as the replaceable contact end 28 of such size and shape as to properly cooperate with the end of one of the strut levers 30 and of course contact ends of any suitable form may be removably secured to the testing lever as by the screws 43. The other strut lever 31 may be engaged by a contact pin or member 23 movably mounted in the base and adjusted toward or from the upper contact 28 as by the setting cam 25 pivoted about the pin 26 so that when the setting handle 27 is moved in a horizontal plane the inclined cam surface 24 is moved under the contact pin to control its vertical position.

A support may be advantageously arranged for the weighted or contact end of the testing lever and as indicated the stud or projection 10 on this lever may be engaged and supported from time to time by the support or adjustable stop 11 which may have threaded engagement with the support stem 12. The lower end of this stem may be connected by the pivot 13 with the link 14 pivoted by the pin 15 to a suitable crank on the rock shaft 16. This rock shaft and crank may be operated by the connected releasing lever 17 having the latch 18 normally spring pressed as by the spring 19 into the notches 20 which may be formed in a suitable sector 22 on the base or frame of the machine. By releasing this latch as by raising the head or projecting end 41 thereof when the handle 42 of this releasing lever is engaged by the operator the releasing lever may be swung downward as indicated by the arrow so as to withdraw the supporting member or stop 11 and allow the standard weight 9 to act on the strut levers of the sprinkler head; while the retrograde upward movement of the releasing lever toward or past the position indicated in the drawing raises the supporting stop so as to engage the projection 10 on the testing lever and support the weight therefrom. Any desired form of indicating mechanism preferably of a relatively sensitive character may be used in connection with either end or other part of the testing lever or element to indicate yielding movement thereof as the strut levers of the sprinkler head yield under the applied force. One illustrative form of such indicating mechanism is shown as comprising the indicator arm 38 which may cooperate at its lower end with the scale 39 having the zero indication 40 thereon and this indicator which may be supported by the post 41 on the base of the machine may be actuated by any suitable magnifying lever connections such as 37 which may be pivoted about the point 34 in the post and loosely pivoted to the indicator through the pin 36 while the short arm 33 of this lever 37 may engage the stud or contact portion 32 on the testing lever 2. In this way the movement of the testing lever causes a greatly increased movement of the indicator so long as the parts 32, 33 are in cooperative engagement.

In using this testing device the sprinkler heads which preferably have had their strut levers and holding devices somewhat overtensioned are placed in engagement with the cooperating contacts 28 and 23. Then the support 11 is withdrawn so as to allow the standard weight on the testing lever or element to act on the sprinkler head strut levers which are so over-tensioned as not to yield appreciably under this testing pressure. Then the operator may by moving the setting handle 27 so adjust the position of the testing lever as to bring the connected indicator 38 to zero point, such as 40, on the scale, all of these movements and adjustments being readily and quickly made. Then the operator gradually releases the tension of the compression or set screw connected with the cap 29 which allows this compression screw to gradually loosen, thus progressively releasing the tension on the cooperating strut levers 30, 31 until finally a point is reached when this tensioning pressure is substantially equal to the testing pressure exerted by the testing lever or element on the ends of these strut levers. A slight but definite yielding movement of the strut levers and testing lever then takes place which causes a considerable movement of the connected indicator which is of course so located and arranged on the machine as to be most readily visible to the operator during these adjustments. At this point, say, for instance, the indicator has moved over one or two divisions on the scale from the zero point; the further loosening adjustment of the compression screw of the sprinkler head is stopped and the releasing lever moved upward so as to bring the supporting stop 11 into engagement with the testing lever and thus substantially or wholly relieve the testing pressure on the strut levers of the head which may then be released and another sprinkler head substituted in the machine. This method of testing the tension of the head involves a substantially definite amount of yield of the strut levers and connected parts under a standard testing pressure which is of course very much preferable to relying on the first perceptible loosening as determined manually by the operator which gives very indefinite results. Furthermore, by making necessary a definite yield of the parts under standard testing pressure a valuable and reliable precaution is secured against dangerous or undesirable over-tensioning of the sprinkler head parts such as might be highly undesirable under conditions of practical operation after the head is installed.

This invention has been described in connection with a number of illustrative embodiments, parts, forms, sizes, proportions, materials and arrangements, to the details of which disclosure the invention is not of course to be limited, since what is claimed as new and what is desired to be secured by Letters Patent is set forth in the appended claims.

I claim:

1. In testing devices for automatic sprinkler heads, a base, a testing lever mounted in said base, a weight cooperating with said lever, a releasing handle and a connected supporting stop movably mounted in said base and adapted to engage the weighted arm of said lever adjacent said weight to support the same, a replaceable contact end on said lever and adapted to engage a sprinkler head strut lever, a cooperating contact pin movably mounted in said base and adapted to engage the other strut lever of the sprinkler head, setting devices cooperating with said contact pin and comprising a setting cam to adjust the position of said contact pin with respect to said contact end and supporting stop and magnifying indicating means cooperating with said testing lever and comprising an indicator and a cooperating scale having a zero point and magnifying lever connections between said indicator and said testing lever to give a substantially definite indication of the slight yield of said strut levers and connected parts of an automatic sprinkler head under the standard testing pressure of said weight.

2. In testing devices for automatic sprinkler heads, a base, a testing lever mounted in said base, a weight cooperating with said lever, a contact end on said lever and adapted to engage a sprinkler head strut lever, a cooperating contact pin movably mounted in said base and adapted to engage the other strut lever of the sprinkler head, setting devices cooperating with said contact pin and comprising a setting cam to adjust the position of said contact pin with respect to said contact end and magnifying indicating means cooperating with said testing lever and comprising an indicator and a cooperating scale having a zero point and magnifying lever connections between said indicator and said testing lever.

3. In testing devices for automatic sprinkler heads, a base, a weighted testing element mounted on said base, a supporting stop movably mounted in said base and adapted to engage said weighted testing element to support the same, a contact member on said testing element and adapted to engage a sprinkler head strut lever, a cooperating contact movably mounted in said base and adapted to engage the other strut lever of the sprinkler head, setting devices cooperating with said contact pin and comprising a setting cam to adjust the relative position of said contact pin and said contact member and magnifying indicating means cooperating with said testing element and comprising a zero point scale and an indicator to give a substantially definite indication of the slight yield under the standard testing pressure of said weight on said strut levers and connected parts of an automatic sprinkler head in case the tension thereof is progressively released.

4. In testing devices for automatic sprinkler heads, a base, a weighted testing element mounted on said base, a contact member on said testing element and adapted to engage a sprinkler head strut lever, a cooperating contact movably mounted in said base and adapted to engage the other strut lever of the sprinkler head, and magnifying indicating means cooperating with said testing element and comprising an indicator to give a substantially definite indication of the slight yield under the standard testing pressure of said weight on said strut levers and connected parts of an automatic sprinkler head in case the tension thereof is progressively released.

5. In testing devices for automatic sprinkler heads, a base, a weighted testing element mounted on said base, a releasing handle and a connected supporting stop movably mounted in said base and adapted to engage said weighted testing element to support the same adjacent the weight, a contact member on said testing element and adapted to engage a sprinkler head strut lever, a cooperating contact pin movably mounted in said base and adapted to engage the other strut lever of the sprinkler head, setting devices cooperating with said contact pin and comprising a setting cam to adjust the relative position of said contact pin and said contact member and magnifying indicating means cooperating with said testing element and comprising an indicator to give a substantially definite indication of the slight yield under the standard testing pressure on said strut levers and connected parts of an automatic sprinkler head when the tension thereof is progressively released.

6. In testing devices for automatic sprinkler heads, a base, a weighted testing element mounted on said base, a contact member on said testing element and adapted to engage a sprinkler head strut lever, a cooperating contact pin movably mounted in said base and adapted to engage the other strut lever of the sprinkler head, setting devices cooperating with said contact pin and comprising a setting cam to adjust the relative position of said contact pin and said contact member and indicating means cooperating with said testing element and comprising an indicator to give a substantially definite indication of the slight yield under the standard testing pressure on said strut levers and connected parts of an automatic sprinkler head when the tension thereof is progressively released.

7. In testing devices for automatic sprinkler heads, a base, a weighted testing element mounted on said base, a contact member on said testing element and adapted to engage a sprinkler head strut lever, a cooperating contact movably mounted in said base and adapted to engage the other strut lever of the sprinkler head, setting devices cooperating with said contact to adjust the relative position of said contact and said contact member and indicating means cooperating with said testing element and comprising an indicator to give a substantially definite indication of the slight yield under the standard testing pressure on said strut levers and connected parts of an automatic sprinkler head.

8. In testing devices adapted for testing the tension automatic sprinkler heads, a weighted testing element, a supporting stop adapted to engage and support said testing element, a contact member on said testing element and adapted to engage a sprinkler head strut lever, a cooperating contact adapted to engage the other strut lever of the sprinkler head, setting devices cooperating with said contact to adjust the relative position of said contact and said contact member and compound lever magnifying indicating means cooperating with said testing element and comprising an indicator adapted to give a substantially definite indication of the slight yield under the standard testing pressure on said strut levers or connected parts of an automatic sprinkler head in case the tension thereof is progressively released.

9. In testing devices adapted for testing the tension automatic sprinkler heads, a testing element and means to apply testing pressure thereto, a contact member on said testing element and adapted to engage a sprinkler head, a cooperating contact adapted to engage another part of the sprinkler head, setting devices cooperating with said contact to adjust the relative position of said contact and said contact member and compound lever magnifying indicating means cooperating with said testing element and comprising an indicator adapted to give a substantially definite indication of the slight yield under the testing pressure on said strut levers or connected parts of an automatic sprinkler head in case the tension thereof is progressively released.

10. In testing devices adapted for testing the tension automatic sprinkler heads, a testing element and means to apply testing pressure thereto, a contact member on said testing element and adapted to engage a sprinkler head, a cooperating contact adapted to engage another part of the sprinkler head, and magnifying indicating means cooperating with said testing element and comprising an indicator adapted to give an indication of the slight yield under the testing pressure on said strut levers or connected parts of an automatic sprinkler head in case the tension thereof is progressively released.

11. In testing devices adapted for adjusting the tension of automatic sprinkler heads, a testing element and means to apply testing pressure thereto, a contact member on said testing element and adapted to engage a sprinkler head, a cooperating contact adapted to engage another part of the sprinkler head, setting devices cooperating with said contact to adjust the relative position of said contact and said contact member and indicating means cooperating with said testing element and comprising an indicator to give a substantially definite indication of the slight yield under the testing pressure on the sprinkler head strut levers or connected parts in case the tension thereof is changed.

12. In testing devices adapted for adjusting the tension of automatic sprinkler heads, a weighted testing element, a contact member on said testing element and adapted to engage a sprinkler head, a cooperating contact adapted to engage another part of the sprinkler head and indicating means cooperating with said testing element and comprising an indicator to give an indication of the slight yield under the testing pressure on the sprinkler head strut levers or connected parts in case the tension thereof is changed.

ALBERT L. ABBOTT.